United States Patent
Yang et al.

(10) Patent No.: US 6,626,452 B2
(45) Date of Patent: Sep. 30, 2003

(54) SUPPORT STRUCTURE FOR CAR SAFETY SEAT

(75) Inventors: Cheng-Fan Yang, Tainan Hsien (TW); Lung-Yin Lin, Nantou Hsien (TW)

(73) Assignee: Link Treasure Limited, Tortola (VG)

( * ) Notice: Subject to any disclaimer, the term of this patent is extended or adjusted under 35 U.S.C. 154(b) by 83 days.

(21) Appl. No.: 09/808,360

(22) Filed: Mar. 15, 2001

(65) Prior Publication Data

US 2002/0056973 A1 May 16, 2002

(30) Foreign Application Priority Data

Nov. 16, 2000 (TW) ..................................... 89219875 U (51) Int. Cl.[7] .............................................. B62B 9/12
(52) U.S. Cl. .................. 280/643; 280/648; 297/256.16
(58) Field of Search .......................... 280/30, 642, 643, 280/647, 648, 650, 33.992, 33.993; 297/256.16, 256.17

(56) References Cited

U.S. PATENT DOCUMENTS

| | | | |
|---|---|---|---|
| 3,550,998 A | * 12/1970 | Boudreau et al. | ........... 280/648 |
| 4,768,795 A | 9/1988 | Mar | |
| 4,822,064 A | 4/1989 | Hunter | |
| 4,861,105 A | * 8/1989 | Merten et al. | ......... 297/256.16 |
| 4,915,446 A | * 4/1990 | Darling et al. | ......... 297/256.16 |
| 4,921,261 A | 5/1990 | Sadler, Jr. et al. | |
| 5,039,118 A | * 8/1991 | Huang | ........................ 280/642 |
| 5,499,831 A | 3/1996 | Worth et al. | |
| 5,564,778 A | * 10/1996 | Shimer et al. | ......... 297/256.16 |
| 5,794,951 A | * 8/1998 | Corley et al. | ................. 280/30 |
| 6,099,022 A | * 8/2000 | Pring | ......................... 280/648 |
| 6,250,654 B1 | * 6/2001 | Willis | .......................... 280/30 |
| 6,322,098 B1 | * 11/2001 | Lan | ............................. 280/642 |
| 6,398,233 B1 | * 6/2002 | Liang et al. | .................. 280/30 |
| 6,428,099 B1 | * 8/2002 | Kain | ..................... 297/256.16 |
| 6,454,350 B1 | * 9/2002 | Celestina-Krevh et al. | ...... 297/256.16 |

FOREIGN PATENT DOCUMENTS

| | | | | |
|---|---|---|---|---|
| GB | 2225557 | * | 6/1990 | ................. 280/643 |
| JP | 4-154477 | * | 5/1992 | ................. 280/650 |

* cited by examiner

*Primary Examiner*—Frank Vanaman
(74) *Attorney, Agent, or Firm*—Birch, Stewart, Kolasch & Birch, LLP (57) ABSTRACT

A support structure for a car safety seat for installation on an extensible and retractable stroller includes a front frame, a rear frame, a handle grip and a support frame. The support structure includes a first and a second support member mounted on the support frame for supporting the weight of a car safety seat. The first support member is stationary. The second support member has two ends engaged respectively with first and second rotary disks which are turnable about the same axis and which maintain a fixed distance with the first support member. By turning the second support member, the relative distance between the first and second support member may change thereby to support car safety seats of different sizes.

15 Claims, 10 Drawing Sheets

SUPPORT STRUCTURE FOR CAR SAFETY SEAT

FIELD OF THE INVENTION

This invention relates to a support structure for a car safety seat and particularly a support structure for a stroller that has adjustable supporting positions for supporting car safety seats of different sizes.

BACKGROUND OF THE INVENTION

It is convenient to carry a small child outdoors in a stroller, because it saves the trouble of carrying or holding the child physically. However, when taking the child in the car for a long distance trip, the stroller becomes cumbersome to carry in the car. A car safety seat for a child is more desirable for such an occasion. There are a lot of car safety seats and strollers in the prior art. Examples can be found in U.S. Pat. Nos. 4,822,064; 4,768,795; 4,921,261; and 5,499,831.

U.S. Pat. No. 4,768,795 discloses a multi-purpose stroller with a detachable frame, in which the seat portion may be detached from the stroller frame for use as a safety seat in the car. However, it requires a special design to support the finction of the stroller and car safety seat.

U.S. Pat. No. 4,822,064 discloses a combination child vehicle seat and stroller which couples a frame and wheels with a car safety seat to form a stroller. Such a design increases the weight of the safety seat, which is difficult to move in the car when in use. When used as the stroller, it will be soiled by dust and dirt which will be carried into the car when it is converted into a car seat again.This will make the interior of the car untidy.

U.S. Pat. No. 4,921,261 proposes an infant conversion stroller which may be converted to a child safety seat. However, the conversion work is not easy to perform and is not practical, especially in inclement weather.

U.S. Pat. No. 5,499,831 discloses a folding stroller for a child's car seat which is collapsible and includes a front wheel frame section, a rear wheel frame section and a handle frame section. The front wheel frame and rear wheel frame respectively engage a support bar at a selected location for holding a child's car safety seat when used as the stroller. The child's car safety seat may be removed from the stroller and used in the car. The stroller may be folded for use later. However, the support bars have a fixed distance therebetween and cannot support a car safety seat of different sizes. For consumers who already have child's car safety seats of different sizes, they need to buy a whole new set including another car safety seat. This is neither sensible nor economical.

All of the known prior art have their share of problems and drawbacks. There is still room for improvement.

SUMMARY OF THE INVENTION

In view of aforesaid disadvantages, it is therefore an object of this invention to provide a support structure for a car safety seat that enables a stroller to support different sizes of car safety seats.

The support structure according to this invention is adapted for a stroller that has a front frame, a rear frame, a handle grip, a support frame, wheels and joints. The front and rear frames respectively have one end pivotally engaged with a wheel. The front frame has another end engaged with a coupling member located in the joint. The handle grip is pivotally engaged with the coupling member. The rear frame also has another end pivotally engaged with another coupling member located in another joint. The support frame is pivotally engaged with the front and rear frame at selected locations. When the stroller is extended, the two coupling members cannot pivotally turn relatively against each other because of a pin harnessed by a slide member. The slide member may be moved, which drives the pin to a position such that the two coupling members can pivotally turn against each other. The stroller thereby becomes foldable for storing.

The support structure located on the stroller includes a first support member located on the handle grip and a second support member located on the support frame. The first and second support members are used to support the weight of the car safety seat. The first support member is stationary, but the second support member has two ends engaged respectively with a first and second rotary disks which are turnable about the same axis. The axis maintains a constant relative distance with the first support member. Hence, turning the second support member may change the relative distance between the first and second support members, to thereby support a car safety seat of different sizes.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention, as well as its many advantages, may be further understood by the following detailed description and drawings. The drawings are only to serve for reference and illustrative purpose, and do not intend to limit the scope of the present invention.

DESCRIPTION OF THE PREFERRED EMBODIMENTS

The support structure for a car safety seat of this invention is used in a stroller 10. By adjusting the relative distance between a first support member 21 and a second support member 23 of a support structure 20, a car safety seat 30 of different sizes can be held and supported.

Figure 1:
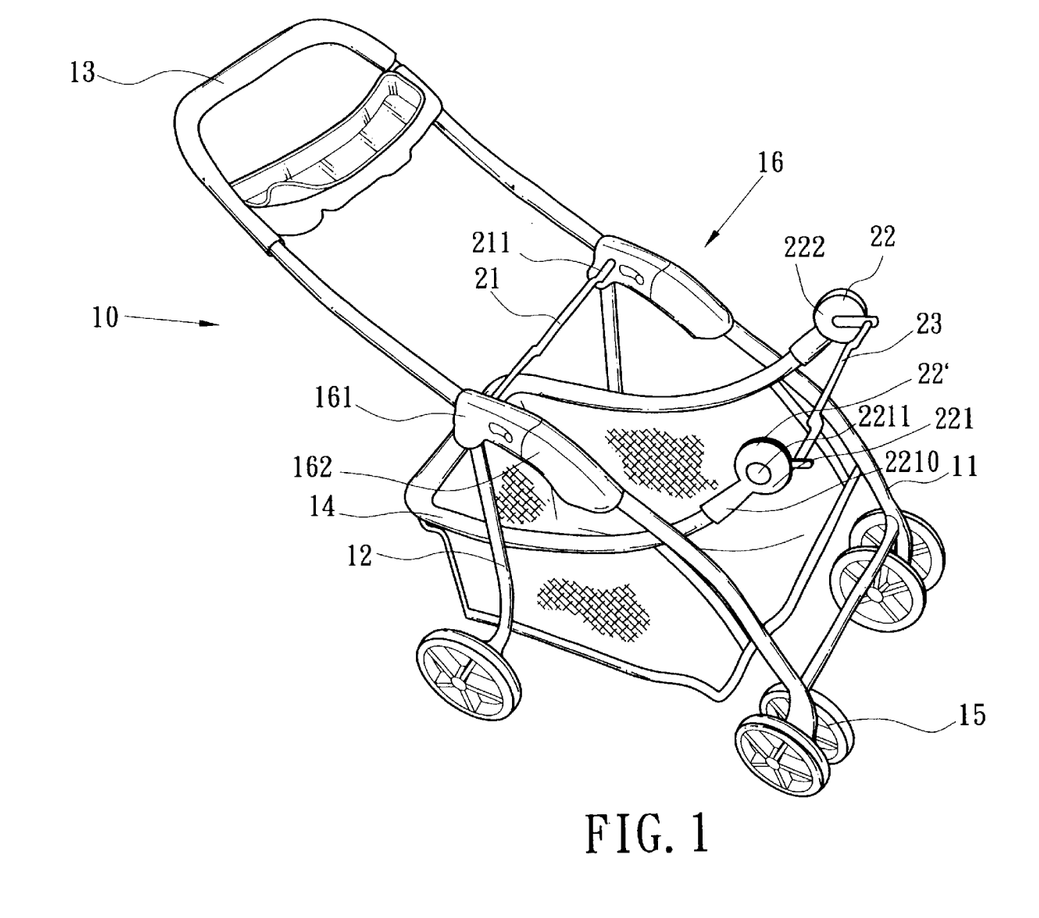
FIG. 1 is a perspective view of a stroller of this invention, at an extended state.

Referring to FIG. 1, the stroller 10 includes a front frame 11, a rear frame 12, a handle grip 13 for users to move the stroller, a support frame 14 for supporting part of the seat weight, wheels 15 and joints 16.

Figure 2:
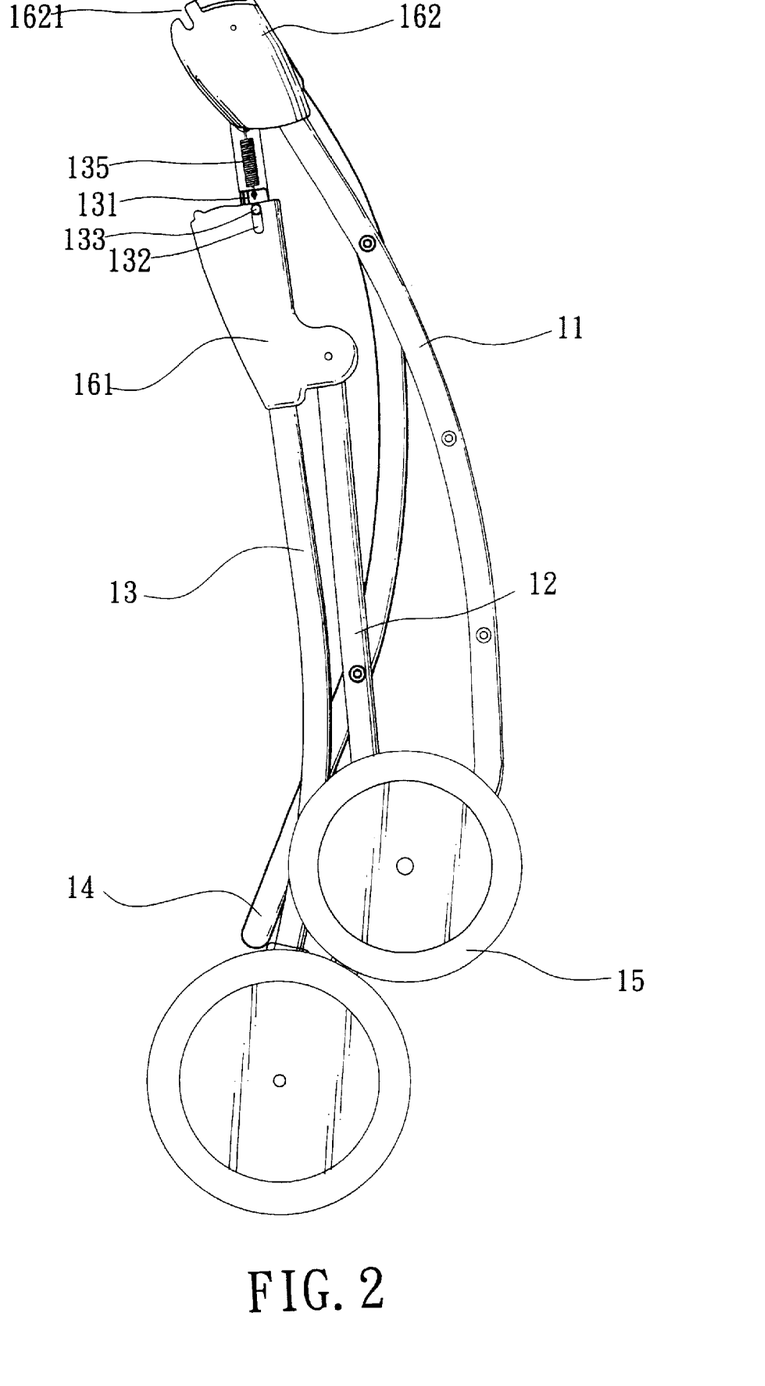
FIG. 2 is a side view of a stroller of this invention, at a retracted state.
Figure 3A:
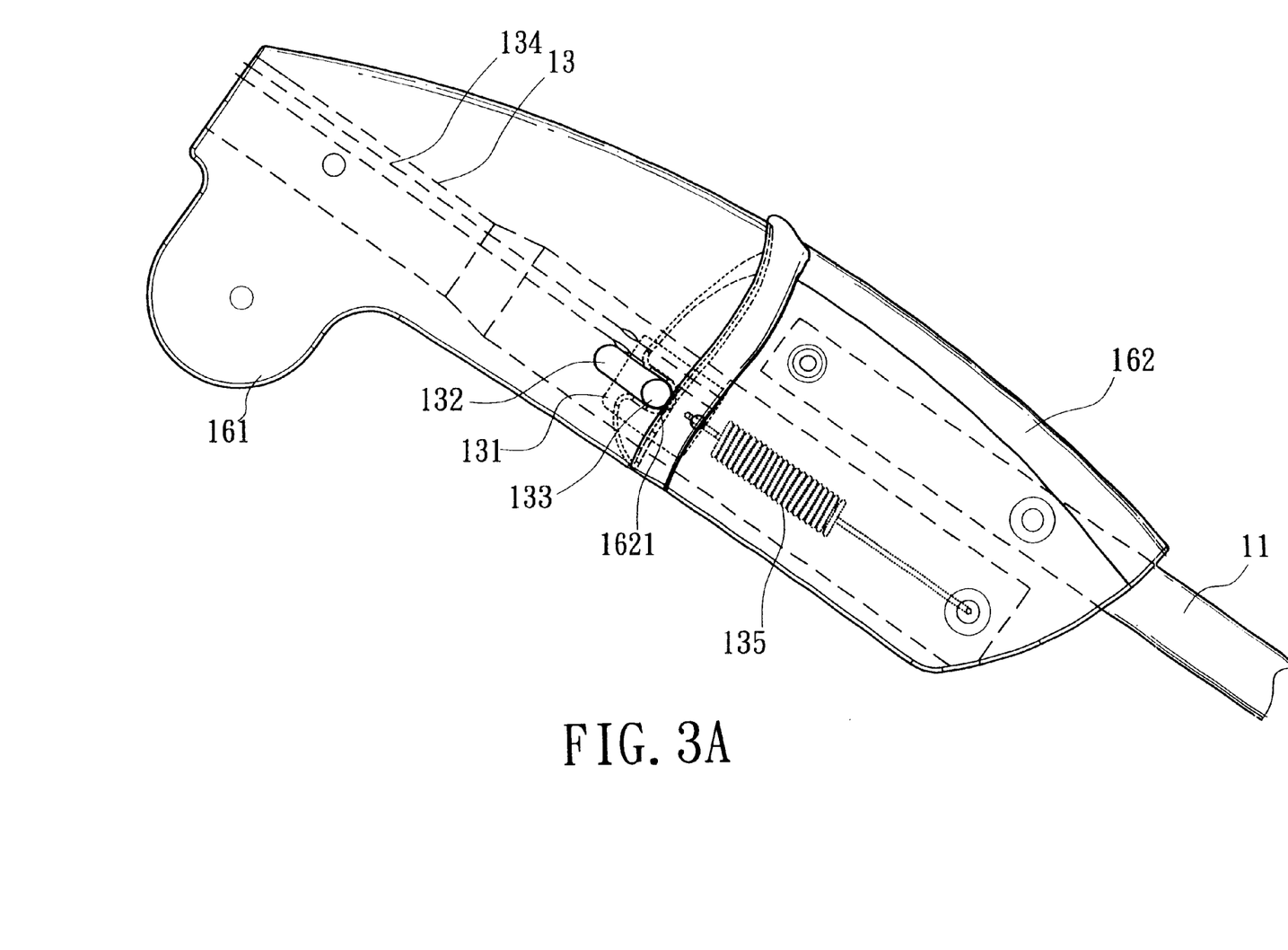
FIGS. 3A and 3B Are fragmentary schematic views of a joint of this invention, at different use states.
Figure 3B:
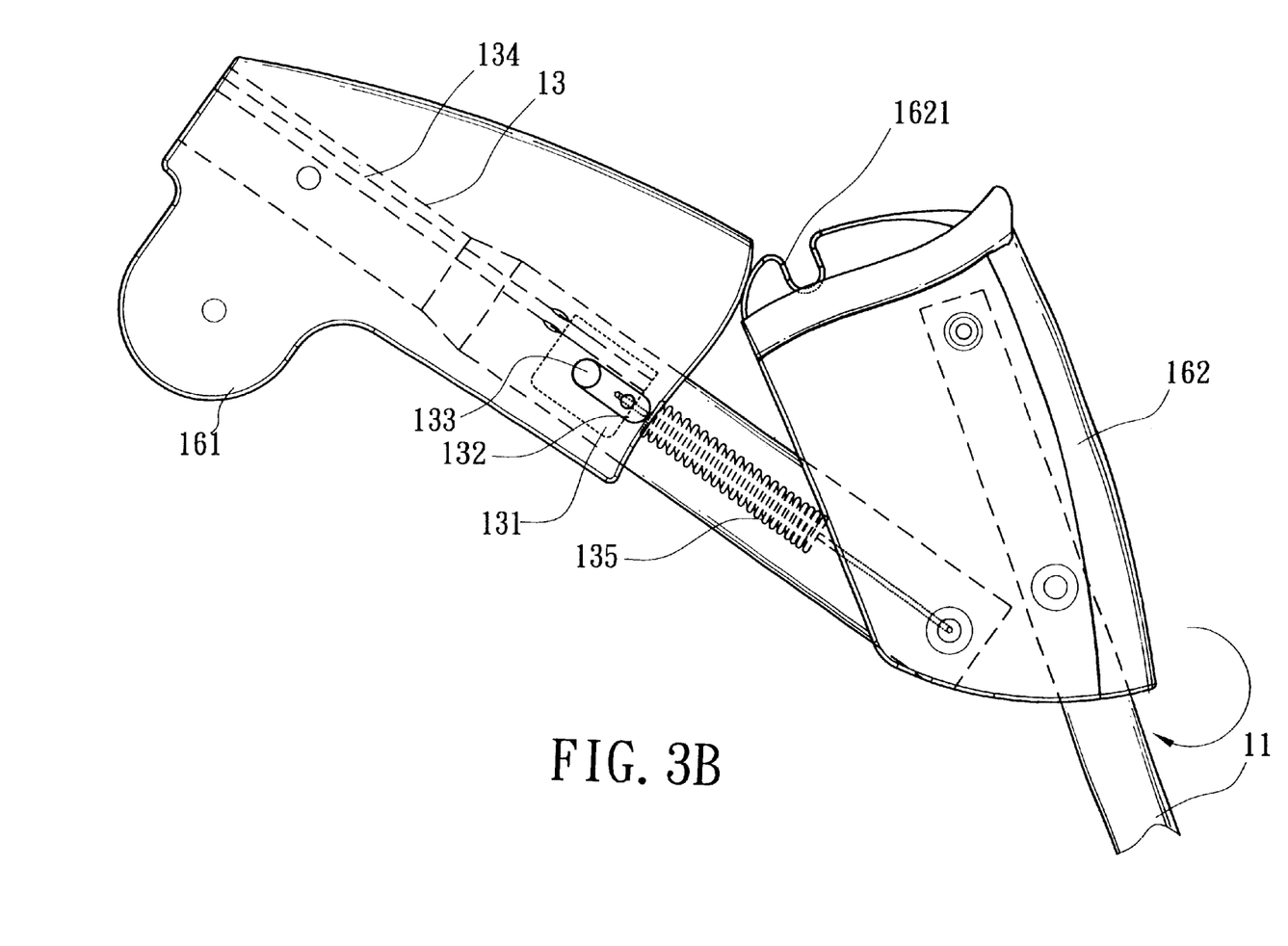

The front frame 11 and rear frame 12 have one end respectively engaged with a wheel 15 for the stroller 10 to be movable as desired. The handle grip 13 is for users to move the stroller 10. In proximity of two ends of the handle grip 13, there are respectively a slide member 131, an elongated slot 132 and a pin 133 fastened to the slide member 131 (shown in FIGS. 3A and 3B). The support frame 14 is for supporting part of the weight of the car safety seat 30 (also shown in FIG. 6). The joints 16 are located at the lateral sides of the stroller 10. Each joint 16 includes a first and second coupling member 161 and 162 which are pivotally engageable with each other. The first coupling member 161 is pivotally engaged with the rear frame 12 and handle grip 13. The second coupling member 162 is pivotally engaged with the front frame 11. The slide member 131 is slidable axially in the handle grip 13. The pin 133 has two ends running through the slot 132 and is movable from one end to another end in the slot 132 by the slide member 131. Under normal conditions, the slide member 131 is pulled by a spring 135 which has one end engaged to one end of the handle grip 13. When the pin 133 is moved to one end of the slot 132, the axial two ends of the pin 133 engage with a notch 1621 of the second coupling member 162 to thereby restrict the first and second coupling members 161 and 162 from pivotally turning relative to each other (as shown in FIG. 3A). At this sate, the handle grip 13 cannot be folded against the front frame 11. On the other hand, when the user pulls a rope 134 attached to one end of the slide member 131 and moves the slide member 131 and pin 133 to another end of the slot 132, the pin 133 will be moved away from the notch 1621 (as shown in FIG. 3B). The front frame 11 and rear frame 12 may then be folded and retracted to facilitate storing (shown in FIG. 2).

The support structure 20 includes a first support member 21, a first rotary disk 22, a second rotary disk 22' and a support member 23.

The first support member 21 is a rod which includes two extended struts 211 at two sides of the first support member 21, which engage with the first coupling member 161. The first support member 21 may contact a contact end 31 located at the bottom of the car safety seat 30 for supporting the car safety seat 30.

Figure 4:
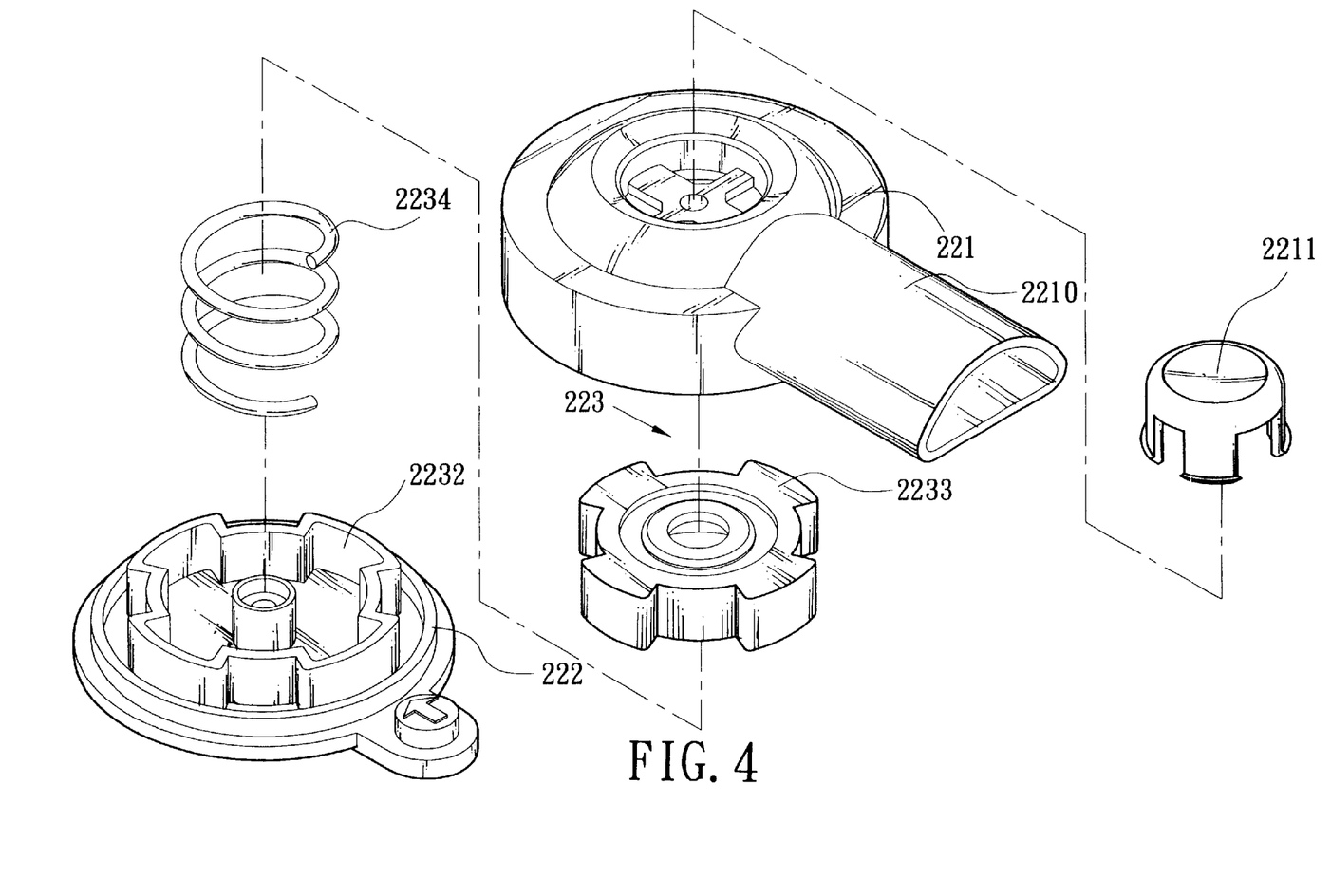
FIG. 4 is an exploded view of first and second rotary disks of this invention.

The first rotary disk 22 and second rotary disk 22' are pivotally and respectively engaged with the support frame 14 at two opposite sides thereof, and are turnable about the same axis. The first and second rotary disks 22 and 22' are identically constructed and each includes a rotary seat 221, a rotating disks 222 and a clutch 223.

The rotary seat 221 has one end fixedly engaged with the stroller 10 at one end of the support frame 14 through a sleeve 2210 or the like and a press button 2211 disposed thereon at the axis position.

The rotating disk 222 is pivotally and axially engaged with the rotary seat 221, and may be turned about the axis of the rotary seat 221. The second support member 23 has two ends respectively engaged with the rotating disk 222 at an eccentric location.

Figure 5A:
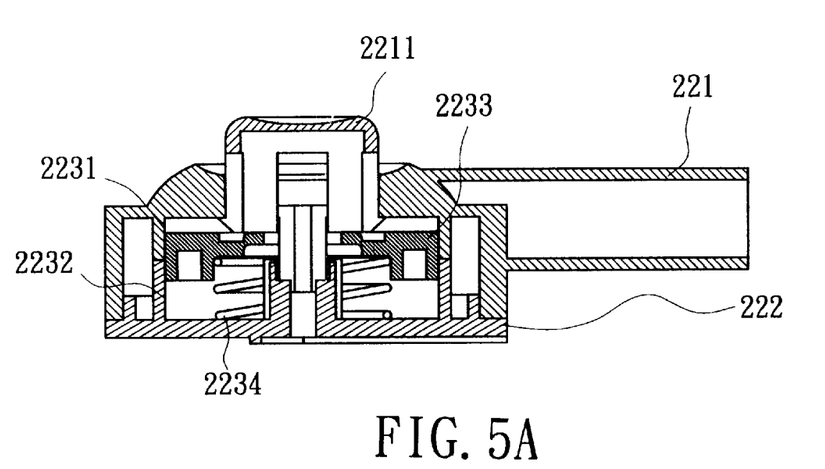
FIGS. 5A and 5B are sectional views of the first and second rotary disks at different use states.
Figure 5B:
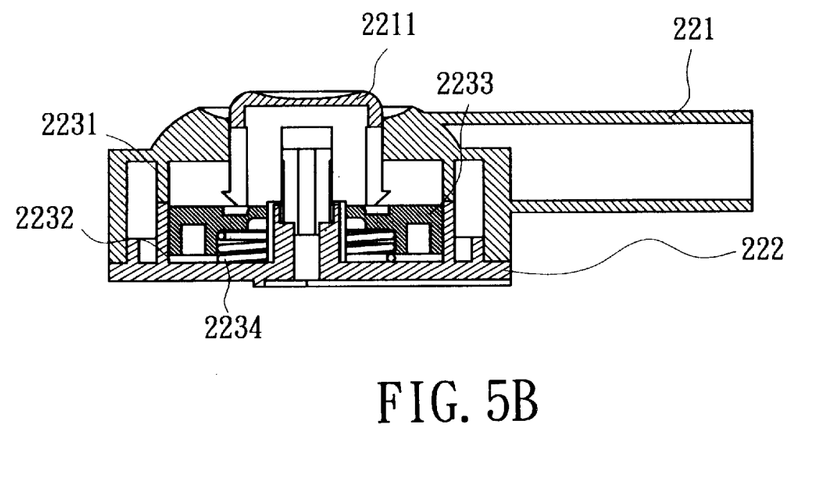

Referring the FIGS. 4, 5A and 5B, the clutch 223 includes a first coupling cavity 2231 located in the rotary seat 221, a second coupling cavity 2232 located in the rotating disk 222, a coupling key 2233 and an elastic element 2234. The first coupling cavity 2231 faces the rotating disk 222 and is axially aligned with the press button 2211 (not shown in the drawing). The second coupling cavity 2232 faces the rotary seat 221 and has a form symmetrically mating with the first coupling cavity 2231 and which is also axially aligned with the press button 2211. The coupling key 2233 is movable axially along the axis of the press button 2211. Under normal coupled conditions, the two ends of the coupling key 2233 are coupled respectively with the first coupling cavity 2231 and second coupling cavity 2232 (shown in FIG. 5A). At the release position, the coupling key 2233 will be moved by the press button 2211 and completely held in the second coupling cavity 2232 to separate from the first coupling cavity 2231 (shown in FIG. 5B). The elastic element is a compression spring 2234 located at the one side of the coupling key 2233 opposite to the press button 2211, for keeping the coupling key 2233 at the coupled position under normal conditions.

Figure 6:
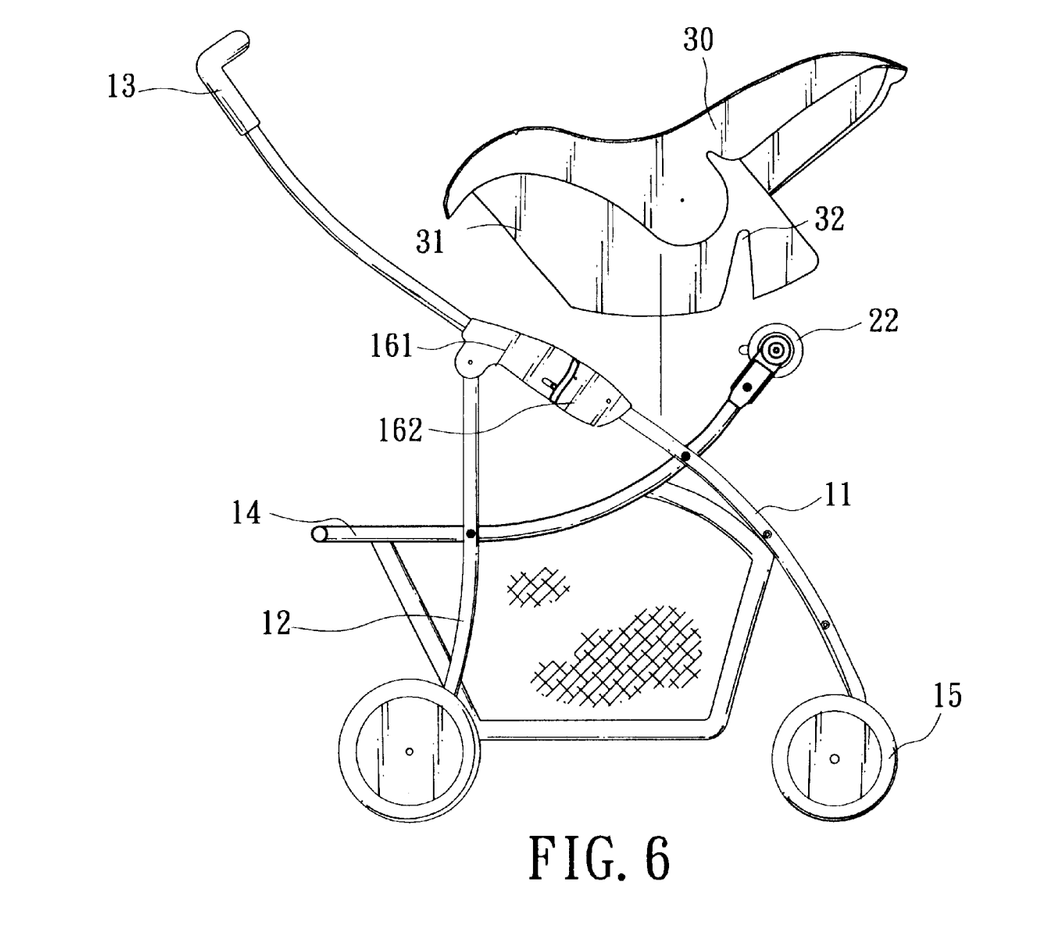
FIG. 6 is a side view of this invention in use.

The second support member 23 is a rod and is engageable with a coupling notch 32 located at the bottom of the car safety seat 30 for supporting the same (shown in FIG. 6). It has two ends pivotally and respectively engaged with the first and second rotary disk 22 and 22' at the same eccentric positions (i.e. at the locations which have a same distance to the center of the rotary disks 22 and 22'). Hence, when the first and second rotary disks 22 and 22' turn, the relative distance between the first and second support members 21 and 23 will be changed. The two sides of the clutch 223 couple respectively with the rotary seat 221 and rotating disk 222 and make them maintain a coupled and relatively stationary relationship with each other under normal conditions. When the press button 2211 is pressed, the rotary seat 221 and rotating disk 222 may be turned relatively against each other and, consequently, the second support member 23 may be turned, thereby changing the relative distance with the first support member 21. When the press button 2211 is released again, the relative positions of the second support member 23 and first support member 21 will be fixed for supporting the contact end 31 and coupling notch 32 at the bottom of the car safety seat 30 (shown in FIG. 6).

Figure 7:
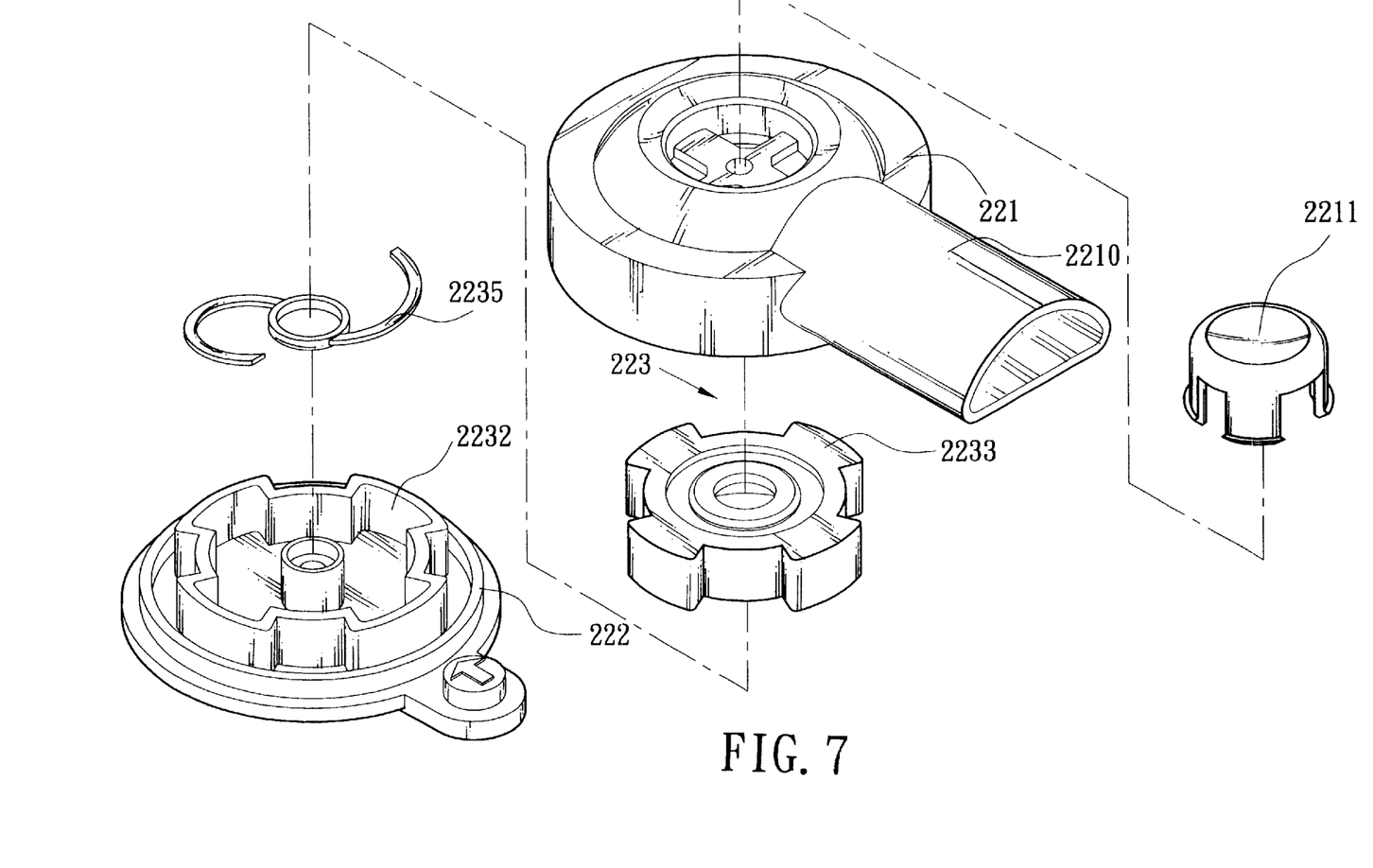
FIG. 7 is an exploded view of another embodiment of this invention.
Figure 8:
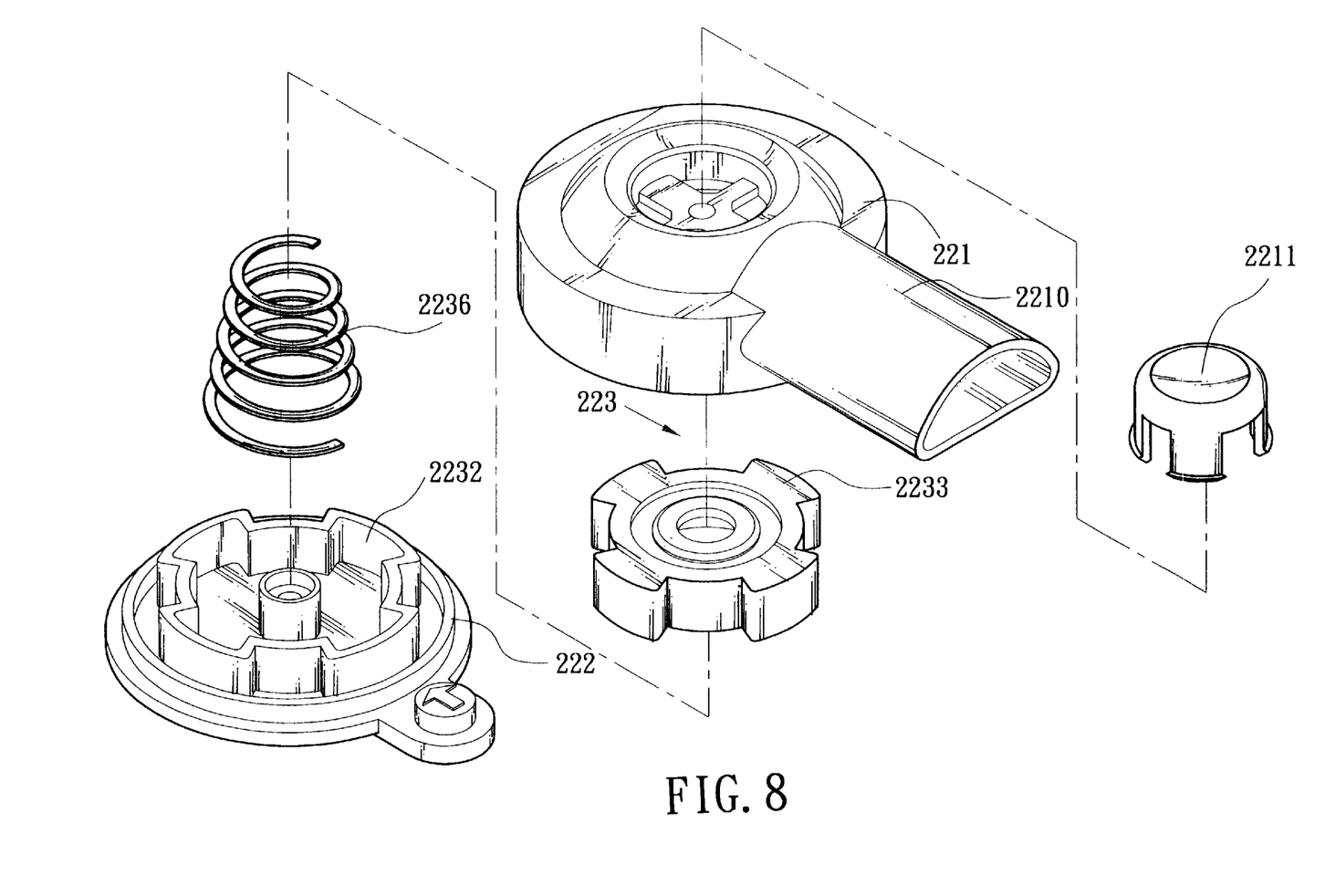
FIG. 8 is an exploded view of a further embodiment of this invention.

Referring to FIG. 7, the aforesaid elastic element may be made of plastic and formed in an S-shaped spring 2235 which has two ends extended toward the coupling key. FIG. 8 shows another embodiment in which the elastic element is a conical-shaped spring 2236. Either of these elastic members may be used to change the relative distance between the first and second support members 21 and 23 and also to make them stationary at the fixed positions relative to each other.

This invention may further use the first rotary disk 22 and the second rotary disk 22' which includes only the rotary seat 221 and rotating disk 222 to change the relative distance between the first and second support members 21 and 23. It functions mainly by pressing the press button 2211 to enable the rotary seat 221 and rotating disk 222 to turn relative to each other, and consequently makes the second support member 23 and the rotating disk 222 turn relative to the rotary seat 221, whereby the relative distance between the second support member 23 and first support member 21 is changed. By again releasing the press button 2211, their relative positions will be fixed. The car safety seat may then be mounted thereon at the contact end 31 and coupling notch 32 (shown in FIG. 6).

Figure 9:
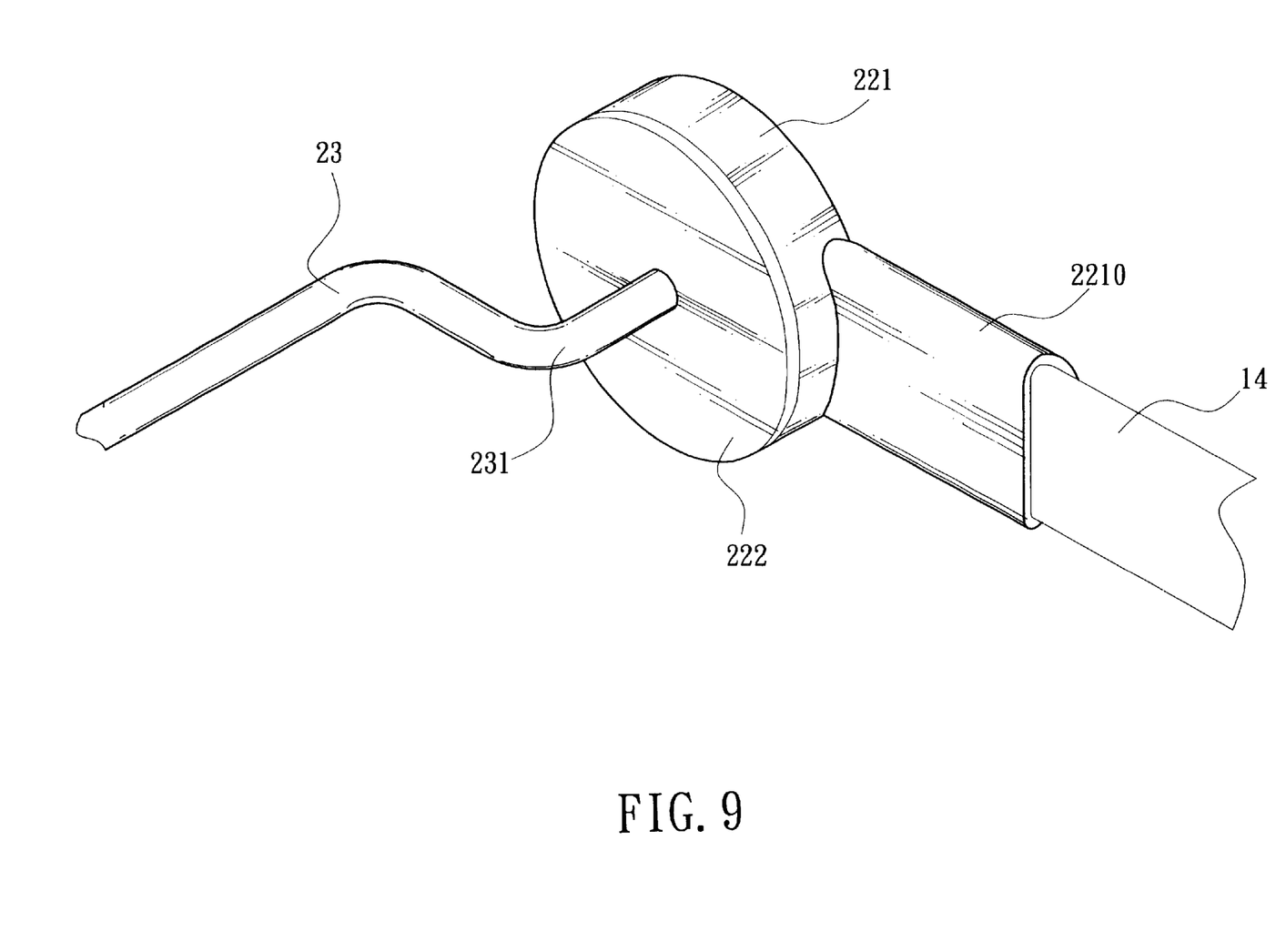
FIG. 9 is a fragmentary perspective view of a second support member of this invention.

Referring to FIG. 9, the second support member 23 may be formed in a U-shape with two ends 231 extended outwards to respectively engage with the axis centers of the first rotary disk 22 and second rotary disk 22'. When the press button 2211 is pressed and the rotary disk 222 is turnable, the second support member 23 may be turned along the rotary disk 222 for changing its position (i.e. to change the relative distance between the first and second support member 21 and 23). By releasing the press button 2211 again, the relative positions between the two will be fixed for mounting the car safety seat 30 at the contact end 31 and coupling notch 32 (shown in FIG. 6).

By means of the construction set forth above, the relative distance between the first and second support members may be changed for supporting car safety seats of different sizes.

It may thus be seen that the objects of the present invention set forth herein, as well as those made apparent from the foregoing description, are efficiently attained. While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A support structure for use in an extensible and retractable stroller having at least a front frame, a rear frame, a handle grip and a support frame to support car safety seats of different sizes by engagement with a contact end and a coupling notch located at a bottom of the car safety seat, comprising:
    a first support member fixedly fastened to the handle grip being engageable with the contact end for supporting the car safety seat;
    a first rotary disk and a second rotary disk pivotally engaged with the support frame at two opposite sides thereof and turnable about an axis; and
    a second support member being engageable with the coupling notch for supporting the car safety seat and having two ends pivotally engaged with the first and second rotary disks at corresponding positions, and being turnable with the first and second rotary disks for changing a relative distance with the first support member.

2. The support structure of claim 1, wherein both the first support member and the second support member are rods.

3. The support structure of claim 1, wherein the first support member has two extended struts formed at two ends thereof fastened to two opposite lateral sides of the stroller.

4. The support structure of claim 1, wherein the first rotary disk and second rotary disk have respectively:
    a rotary seat engaged with the stroller having a press button disposed in a coaxial manner;
    a rotating disk pivotally engaged with the rotary seat in a coaxial manner and being turnable about an axis of the rotary seat and being engaged with one end of the second support member at an eccentric location; and
    a clutch located at a coupled position and being movable to a release position, and having two sides coupled with the rotary seat and the rotating disk in the coupled position for keeping the rotary seat and the rotating disk at relatively stationary positions, and enabling the rotary seat and the rotating disk to turn relative to each other in the release position.

5. The support structure of claim 4, wherein the clutch includes:
    a first coupling cavity located in the rotary seat facing the rotating disk and being coaxial with the press button;
    a second coupling cavity located in the rotating disk facing the rotary seat and having a form symmetrically mating with the first coupling cavity and being coaxial with the press button;
    a coupling key movable in the axial direction of the press button having two ends coupled with the first and second coupling cavity when in the coupled position, and being pushed completely in the second coupling cavity by the press button to separate from the first coupling cavity when in the release position; and
    an elastic element located at one side of the coupling key opposite to the press button for keeping the coupling key in the coupled position.

6. The support structure of claim 5, wherein the elastic element is a compression spring.

7. The support structure of claim 5, wherein the elastic element is a S-shaped spring.

8. The support structure of claim 5, wherein the elastic element is a conical-shaped spring.

9. The support structure of claim 1, wherein the first rotary disk includes:
    a rotary seat engaged with the stroller having a press button disposed in a coaxial manner:
    a rotating disk pivotally engaged with the rotary seat in a coaxial manner and being turnable about an axis of the rotary seat and being engaged with one end of the second support member at an eccentric location; and
    a clutch located at a coupled position and being movable to a release position, and having two sides coupled with the rotary seat and the rotating disk in the coupled position for keeping the rotary seat and the rotating disk at relatively stationary positions, and enabling the rotary seat and the rotating disk to turn relative to each other in the release position; and
    the second rotary disk includes:
        a rotary seat engaged with the stroller; and
        a rotating disk pivotally engaged with the rotary seat of the second rotary disk in a coaxial manner and being turnable about the axis of the rotary seat of the second rotary disk and being engaged with another end of the second supporting member at an eccentric location.

10. The support structure of claim 9, wherein the clutch includes:
    a first coupling cavity located in the rotary seat facing the rotating disk and being coaxial with the press button;
    a second coupling cavity located in the rotating disk facing the rotary seat having a form symmetrically mating with the first coupling cavity and being coaxial with the press button;
    a coupling key movable in the axial direction of the press button having two ends coupled with the first and second coupling cavity at the coupled position, and being pushed completely in the second coupling cavity by the press button to separate from the first coupling cavity at the release position; and
    an elastic element located at one side of the coupling key opposite to the press button for keeping the coupling key in the coupled position.

11. The support structure of claim 10, wherein the elastic element is a compression spring.

12. The support structure of claim 10, wherein the elastic element is a S-shaped spring.

13. The support structure of claim 10, wherein the elastic element is a conical-shaped spring.

14. The support structure of claim 1, wherein the second support member has two ends engaged with the axis of the first and second rotary disks.

15. The support structure of claim 1, wherein the second support member has two ends engaged with the first and second rotary disks at eccentric positions.

* * * * *